(12) United States Patent
Paredes et al.

(10) Patent No.: US 9,647,751 B2
(45) Date of Patent: May 9, 2017

(54) OUT-OF BAND MANAGEMENT OF FIBER OPTICS SYSTEMS AND DEVICES

(71) Applicant: LEVEL 3 COMMUNICATIONS, LLC, Broomfield, CO (US)

(72) Inventors: Salvador E. Paredes, Broomfield, CO (US); Timothy I. Copley, Tempe, AZ (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/194,462

(22) Filed: Jun. 27, 2016

(65) Prior Publication Data
US 2016/0308607 A1  Oct. 20, 2016

Related U.S. Application Data

(63) Continuation of application No. 14/455,617, filed on Aug. 8, 2014, now Pat. No. 9,380,362.
(Continued)

(51) Int. Cl.
*H04B 10/077* (2013.01)
*H04Q 11/00* (2006.01)
(Continued)

(52) U.S. Cl.
CPC ....... *H04B 10/0775* (2013.01); *H04B 10/073* (2013.01); *H04B 10/25* (2013.01);
(Continued)

(58) Field of Classification Search
CPC .... H04B 10/0775; H04B 10/25; H04B 10/27; H04B 10/073; H04Q 11/0005;
(Continued)

(56) References Cited

U.S. PATENT DOCUMENTS

| | | |
|---|---|---|
| 5,943,321 A | 8/1999 | St-Hilaire et al. |
| 6,594,232 B1 | 7/2003 | Dupont |

(Continued)

FOREIGN PATENT DOCUMENTS

| | | |
|---|---|---|
| EP | 2144400 A1 | 1/2010 |
| WO | WO-2005032084 A1 | 4/2005 |
| WO | WO-2015021419 A1 | 2/2015 |

OTHER PUBLICATIONS

International Search Report, dated Nov. 18, 2014, Int'l Appl. No. PCT/US14/050404, Int'l Filing Dated Aug. 8, 2014; 3 pgs.
(Continued)

*Primary Examiner* — Leslie Pascal

(57) ABSTRACT

A communication network including a master switch and one or more local switches is provided with a loop-back test device for in line loop-back testing. The local switches convey communication traffic between one another using one or more channels of a transmission medium and configuration information using an out-of-band channel of the transmission medium that is separate from the channels used to convey the communication traffic. The master switch includes an application that generates configuration information including loop-back connection information for configuring the out-of-band channel using at least one loop-back test device, transmits the generated configuration information to the loop-back test device using the out-of-band channel of the transmission medium, and conducts loop-back testing using the out-of-band channel.

20 Claims, 5 Drawing Sheets

Related U.S. Application Data

(60) Provisional application No. 61/863,532, filed on Aug. 8, 2013, provisional application No. 61/892,092, filed on Oct. 17, 2013.

(51) Int. Cl.
| | | |
|---|---|---|
| *H04L 12/931* | (2013.01) | |
| *H04L 12/939* | (2013.01) | |
| *H04J 14/02* | (2006.01) | |
| *H04B 10/25* | (2013.01) | |
| *H04B 10/27* | (2013.01) | |
| *H04B 10/073* | (2013.01) | |

(52) U.S. Cl.
CPC .............. *H04B 10/27* (2013.01); *H04J 14/02* (2013.01); *H04J 14/0275* (2013.01); *H04L 49/555* (2013.01); *H04L 49/65* (2013.01); *H04Q 11/00* (2013.01); *H04Q 11/0005* (2013.01); *H04Q 11/0062* (2013.01); *H04B 2210/078* (2013.01); *H04Q 2011/0016* (2013.01); *H04Q 2011/0083* (2013.01)

(58) Field of Classification Search
CPC ....... H04Q 11/0062; H04Q 2011/0016; H04Q 2011/0083; H04J 14/02
See application file for complete search history.

(56) References Cited

U.S. PATENT DOCUMENTS

| | | |
|---|---|---|
| 7,483,370 B1 | 1/2009 | Dayal et al. |
| 8,335,432 B1 | 12/2012 | Darcie et al. |
| 9,195,483 B2 * | 11/2015 | Devarapalli ............ G06F 9/455 |
| 2002/0046271 A1 | 4/2002 | Huang |
| 2004/0091264 A1 | 5/2004 | Beshai |
| 2004/0131020 A1* | 7/2004 | Smith .................... H04N 7/162 |
| | | 370/312 |
| 2004/0223503 A1 | 11/2004 | Lynch et al. |
| 2006/0080318 A1* | 4/2006 | Huston ............... H04L 41/0886 |
| 2006/0210268 A1 | 9/2006 | Gumaste et al. |
| 2007/0297798 A1 | 12/2007 | DeCusatis et al. |
| 2009/0022489 A1 | 1/2009 | Way |
| 2012/0195588 A1 | 8/2012 | Way |
| 2012/0254445 A1* | 10/2012 | Kawamoto ........... G06F 9/5088 |
| | | 709/226 |
| 2015/0043912 A1 | 2/2015 | Paredes et al. |

OTHER PUBLICATIONS

Written Opinion of the International Searching Authority, dated Nov. 18, 2014, Int'l Appl. No. PCT/US14/050404, Int'l Filing Dated Aug. 8, 2014; 4 pgs.

Extended European Search Report, dated Mar. 20, 2017, Application No. 14834807.1, filed Aug. 8, 2014, 8 pgs.

* cited by examiner

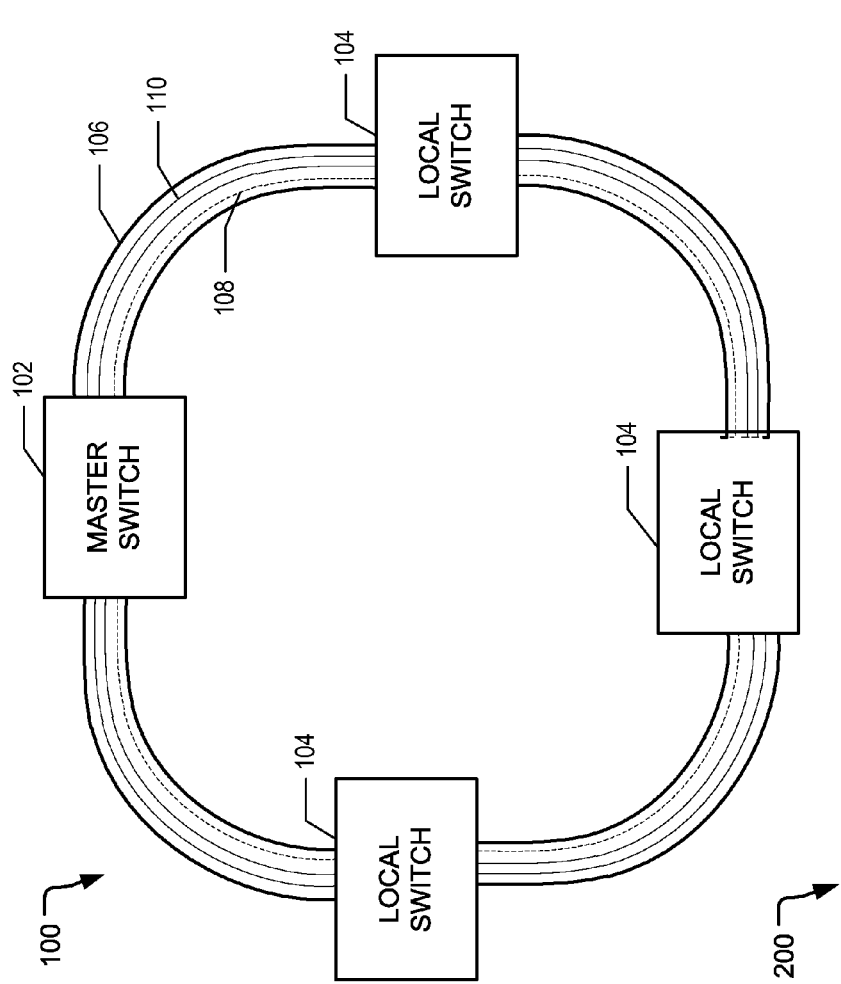
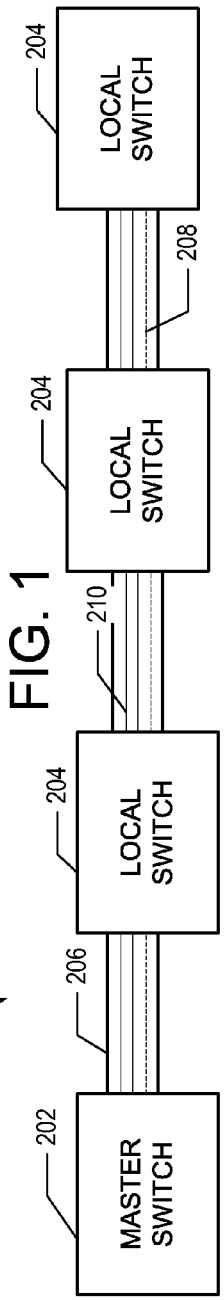
FIG. 1
FIG. 2

OUT-OF BAND MANAGEMENT OF FIBER OPTICS SYSTEMS AND DEVICES

CROSS-REFERENCE TO RELATED APPLICATIONS

This application is a continuation of and claims the benefit of priority to U.S. patent application Ser. No. 14/455,617 entitled "Out-of-Band Management of Fiber Optics Systems and Devices," filed on Aug. 8, 2014, the contents of which are incorporated by reference herein in its entirety for all purposes. Application Ser. No. 14/455,617 claims the benefit of priority to U.S. Provisional Application No. 61/863,532 entitled "Management of Fiber Optics Systems and Devices," filed on Aug. 8, 2013, and U.S. Provisional Application No. 61/892,092 entitled "Management of Fiber Optics Systems and Devices," filed on Oct. 17, 2013, the contents of both are incorporated by reference herein in their entirety for all purposes.

TECHNICAL FIELD

Aspects of the present disclosure relate to communication networks and, in particular, to a fiber optic system and method of managing the fiber optic system.

BACKGROUND

Communication networks generally include multiple nodes that are coupled together using one or more links, which may include for example, wired and/or wireless communication links. Communication links generally include a transmission medium through which data traffic is conveyed. One particularly effective type of transmission methodology is dense wavelength division multiplexing (DWDM), which provides excellent data capacity (e.g., bandwidth). Generally speaking, DWDM involves the transmission of data using light traveling through fiber optic cables. DWDM systems typically include fiber optic cables with multiple light transmitter/receiver pairs on either end that transmit and receive light signals at differing wavelengths. The receivers are sufficiently selective to independently receive and process light energy at its respective frequency independently of light energy at other wavelengths, thus enhancing the amount of data (e.g., bandwidth) that may be simultaneously conveyed through the fiber optic medium.

Amongst a myriad of uses, relatively large metropolitan networks—computing and/or telecommunication networks deployed in and around metropolitan areas—have been implemented using the enhanced data carrying capabilities provided by these DWDM transmission systems. One particular problem, however, commonly experienced by network providers has been implementing such systems in an extensible manner such that the data handling capacity of the network may grow as the customer base of the network provider grows. In particular, packet data networks, such as Internet protocol (IP) networks, are typically implemented in a particular region using multiple switches (e.g., routers) that intelligently route customer data through the network on a per packet basis. Packet data networks are used by people to access the Web sites on the Internet, send and receive email, and the like.

To efficiently route traffic through the network, each switch is often configured with certain parameters, such as network routing protocol configuration, topology configuration, failover parameters, and the like that optimizes its operation in conjunction with other nearby switches with which they communicate. Nevertheless, communication networks often require monitoring and testing of the various links that make up the communication network to ensure the validity, continuity, and status of such links. For example, communication links may often require monitoring to detect disconnections, physical breaks, and faults so that corrective action can be taken. Like any distributed system, networks are also susceptible to problems ranging from digging operations cutting through fiber cables under ground to installers inadvertently disconnecting components. It is often the case that service providers must install expensive equipment, such as termination equipment, at a customer's site to monitor its optical network links and fibers. Alternatively, network service providers may dispatch a maintenance crew to a customer's location for testing and monitoring purposes, which is both expensive and time-consuming. It is with these issues in mind, among others, that various aspects of the present disclosure have been developed.

SUMMARY

According to one aspect, a communication network including a master switch and one or more local switches is provided with a loop-back test device for in line loop-back testing. The local switches convey communication traffic between one another using one or more channels of a transmission medium and configuration information using an out-of-band channel of the transmission medium that is separate from the channels used to convey the communication traffic. The master switch includes an application that generates configuration information including loop-back connection information for configuring the out-of-band channel using at least one loop-back test device, transmits the generated configuration information to the loop-back test device using the out-of-band channel of the transmission medium, and conducts loop-back testing using the out-of-band channel.

BRIEF DESCRIPTION OF THE DRAWINGS

The various features and advantages of the technology of the present disclosure will be apparent from the following description of particular embodiments of those technologies, as illustrated in the accompanying drawings. Like reference characters may refer to the same components, features, and the like throughout the different views. The drawings depict only typical embodiments of the present disclosure and, therefore, are not to be considered limiting in scope.

FIG. 1 depicts an example network on which a centralized communication network control system may be implemented to perform loop-back testing according to embodiments of the present disclosure.

FIG. 2 shows another network on which a centralized communication network control system may be implemented to perform loop-back testing according to embodiments of the present disclosure.

DETAILED DESCRIPTION

Figure 3A:
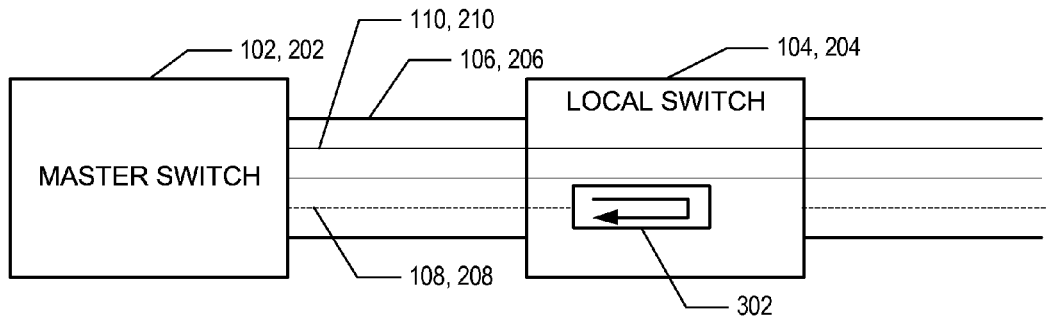
FIGS. 3A-3C Illustrate example loop-back connections that may be established in the communication network according to embodiments of the present disclosure.

Aspects of an out-of-band control system for a communication network described herein provides for controlling the operation of one or more remotely located network nodes (e.g., switches) from a centralized controller using out-of-band signaling. The out-of-band signaling is provided by a separate channel that conveys control signals from the controller to each node in a manner that is generally impervious to network congestion typically experienced during occasional peak usage periods within the network. Aspects of the present disclosure also provide a loop-back connection using the out-of-band channel to facilitate testing of the communication network from the centralized controller, thus alleviating the necessity of costly termination equipment and/or maintenance personnel that would otherwise be required at the customers' site where the remote network nodes are located.

FIG. 1 depicts an example communication network 100 on which a centralized communication network control system may be implemented according to embodiments of the present disclosure. The system includes a master switch 102 in communication with multiple local switches 104 using a transmission medium 106. The master switch 102 communicates with the local switches 104 using a dedicated channel 108 of the transmission medium that is separate and distinct from other channels 110 of the transmission medium used to convey traffic (i.e., data) between each of the local switches 104 and the master switch 102.

In one embodiment, the transmission medium 106 includes a dense wavelength division multiplexing (DWDM) transmission medium that conveys traffic using multiple transmitter/receiver pairs using multiple, different wavelengths relative to one another. That is, the DWDM transmission medium is configured to convey traffic using multiple wavelengths corresponding to multiple channels of the medium in which one wavelength (i.e., channel) of the DWDM transmission medium is dedicated to conveying control and response messages between the master switch 102 and the local switches 104, while the other wavelengths (i.e., channels) of the DWDM transmission medium convey traffic (e.g., data). Thus, the channels conveying traffic form a data plane, while the channel conveying control and response messages forms a management plane that is separate and distinct from the data plane. In other embodiments, any type of transmission medium may be used. For example, the transmission medium 106 may be a wireless radio-frequency (RF) link that is channelized using multiple different frequencies of operation. As another example, the transmission medium 106 may be one using a time-division multiplexing scheme of operation.

Certain embodiments using a dedicated wavelength (e.g., channel) of a DWDM transmission medium for control signaling may provide enhanced security over conventional systems that use in-band control signaling. For example, intrusion into the control system of the network through the fiber transmission medium may be difficult to attain due to the channelized light signal that requires special knowledge of which wavelength is being used as the control channel in addition to the necessity of providing a special transmitter/receiver pair capable of selectively transmitting and receiving signals at that wavelength. Additionally, only a portion of the hardware that is used to implement a control section of each master switch 102 and local switch 104 may be hardened against intrusion, thus alleviating the necessity of hardening all hardware components from intrusion.

According to one aspect, the master switch 102 and local switches 104 are packet-based switches that communicate with one another using a packet-based protocol, such as an Internet protocol (IP). The master switch 102 and local switches 104 may be positioned at various locations around a metropolitan region for providing telecommunication services around that region. For example, one local switch 104 may be configured at a hospital, another local switch 104 configured at a university, while yet another local switch 104 is configured at a multi-tenant housing complex. While discussed in the context of a metro, the presently described inventive technology is not limited thereto but rather such examples are merely provided for context. One of the local switches 104 may also be configured as a gateway to other networks, such as public switched telephone network (PSTN), or even another packet-based network, such as the public Internet. In one embodiment, the master switch 102 and local switches 106 each include small form-factor pluggable (SFP) transceivers for transmitting and receiving signals from the transmission medium 106. The local switches 106 each have one or more processors and executable instructions stored in volatile and/or non-volatile memory for performing the actions and/or steps described herein.

The network may have any desired configuration. For example, the particular network as shown in FIG. 1 is arranged in a ring configuration in which traffic may travel in either or both directions (i.e., clockwise or counterclockwise in the simplified network shown) from a source switch to a destination switch. Such a configuration as this may be useful to protect against network outages caused by cuts in or damages to the transmission medium 106. In this situation, traffic that would otherwise travel through the cut transmission medium 106 may be diverted in the opposite direction to reach its respective destination switch.

FIG. 2 shows another network 200 on which a centralized communication network control system may be implemented according to embodiments of the present disclosure. The network 200 includes a master switch 202, and one or more local switches 204 that communicate among one another using a transmission medium 206 that are similar in design and construction to the master switch 102, local switches 104, and transmission medium 106, respectively, of FIG. 1. The network 200 differs, however, in that the master switch 202 is in communication with the one or more local switches 204 using a configuration commonly known as a string configuration. It should be understood that the principles of the centralized control system as described herein will function with the network 200 configured in a string configuration, with the network 100 configured in the ring configuration, as well as combinations thereof and other configurations.

Certain embodiments of the present disclosure may provide an advantage in that centralized control of the switches in the network can provide for optimal efficiency on an ongoing basis. For example, switches that operate according to a packet-based transmission protocol, such as the IP protocol, typically use routing tables that are configured to selectively route multiple independent data paths (sometimes referred to as "hops") through the network. Moreover, these routing tables are typically configured according to certain routing protocols, such as a spanning tree protocol (STP), a rapid spanning tree protocol (RSTP), or a shortest path forwarding (SPF) protocol, in which each switch 102 and 104 modifies its routing table according to constraints of other switches in the network, and vice-versa. Nevertheless, conventional network configurations, which do not have a centralized network configuration controller, are constrained to using these routing algorithms in a distributive fashion in which each switch modifies its routing table in an iterative manner until an optimal solution is reached and routing information is propagated through the network. The centralized controller according to the teachings of the present disclosure provide a solution to this problem by centrally performing the routing algorithm in a centralized controller that has intimate knowledge of most or all aspects of the switches in the network. Additionally, the centralized network controller may provide an advantage when additional switches are added to the network by adjusting the routing algorithms to accommodate for the new capacity provided by the newly implemented switch in an efficient manner.

Additionally, local switches 104 may need to be re-provisioned in response to changes in demand placed on the network by its users. For example, an emergency situation, such as a severe weather event or a multi-building fire proximate one local switch 104 may cause traffic on that switch to experience a particularly large amount of traffic volume. As another example, the opening of a new shopping plaza or of a multi-tenant housing complex proximate another local switch 104 may cause the traffic volume proximate that switch to experience high levels of traffic volume due to the increased population density in that region. Situations such as these often make reconfiguration from a centralized location, such as at the master switch 102 difficult due to congestion within the transmission medium 106. However, embodiments of the present disclosure provide a solution to this problem by dedicating a channel to conveying control messages independently of other channels used to convey data.

Figure 3B:
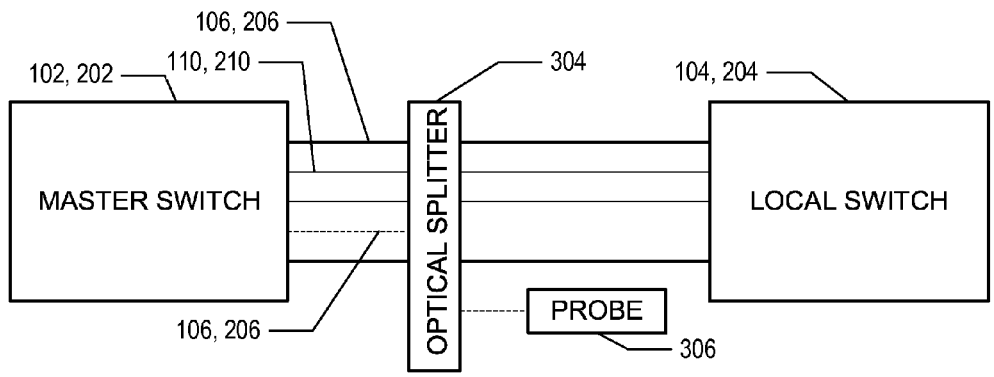
Figure 3C:
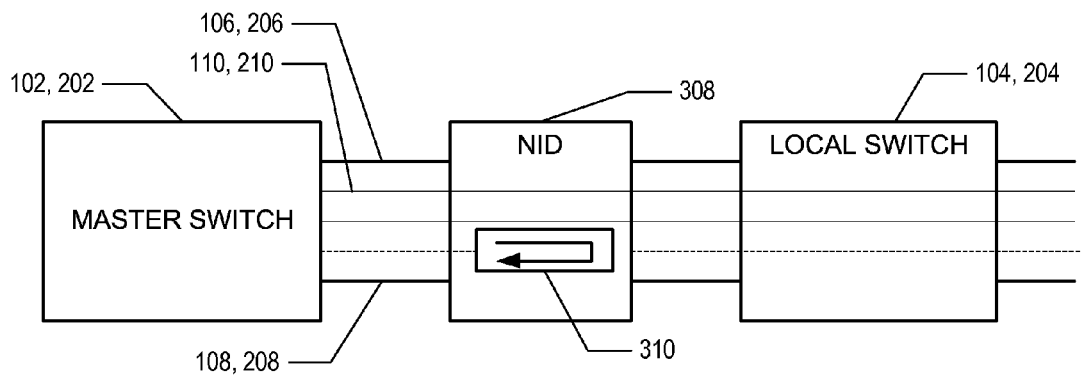

FIGS. 3A, 3B, and 3C Illustrate example loop-back connections that may be established in the communication network according to embodiments of the present disclosure. In general, the configuration of the loopback connection may be integrally configured in a local switch (FIG. 3A), or configured externally from the local switch (FIGS. 3B and 3C), for inline testing of the transmission medium 106, 206. Testing may be performed under control of the master switch 102, 202. Nevertheless, other embodiments contemplate that the loopback connection is configured separately from either local switch 104, 204 for reasons that will be discussed in detail below.

Generally speaking, the loopback connection may be useful for monitoring or otherwise measuring signal quality over the transmission medium 106, 206 between the master switch 102, 202 and the local switch 104, 204. For example, the loop-back configuration may detect lossy connections or other anomalies in transmission mediums, such as fiber optic cables or connectors that interconnect the fiber optic cables to equipment, such as local switches, repeaters, and the like.

As shown in FIG. 3A, the local switch 104, 204 is provisioned to internally loop back the signal received from the dedicated channel 108 via at least a portion of its switch fabric 302. Although the present example shows the switch fabric of the local switch 104, 204 being configured to form the internal loopback connection, any suitable device, such as a network interface device (NID), which is described below and is capable of mirroring traffic received from a particular channel in the opposite direction may be used.

In one embodiment, the switch fabric 302 includes monitoring circuitry for measuring signal quality at the loop-back interface and transmitting the measured signal quality information to the master switch 102, 202 as telemetry data for processing by the master switch 102, 202. Additional details related to measuring and/or monitoring the loop-back connection by the local switch 104, 204 are described in U.S. patent application Ser. No. 13/591,406, filed Aug. 22, 2012, and entitled "Apparatus, System, and Method For Network Monitoring," the contents of which are incorporated by reference in its entirety.

FIG. 3B shows an example external configuration of a loopback connection according to embodiments of the present disclosure. The external loopback connection includes an optical splitter 304 that is in communication with a probe 306. The optical splitter 304 separates the channels of the transmission medium 106, 206 such that the dedicated channel 108, 208 is directed to the probe 306, while the other channels 110, 210 are directed toward the local switch 104, 204. The probe 306 is controlled by the master switch 102, 202 to measure one or more characteristics of the received signal and transmit results of the measured characteristics back to the master switch 102, 202 for analysis by personnel. Configuration of the loopback connection external to the local switch may be beneficial in that deployment of the loopback connection may be performed without interfering with the customer's equipment or other on site equipment, which must often be placed in the customer's private premises.

FIG. 3B shows another example external configuration of a loopback connection that uses a network interface device (NID) 308 according to embodiments of the present disclosure. The NID 308 generally comprises a network component that may be configured in line with the transmission medium 106, 206 to form a loop-back connection. For example, the NID 308 may be configured in a portion of the transmission medium 106, 206 that is managed by the service provider of the network 100, 200, thus not hindering or obstructing operation of the local switch 104, 204 that is often managed by a customer of the service provider. The NID 308 includes a switch fabric portion 310 that is provisioned to internally loop back the signal received from the dedicated channel 108, 208, and may include one or more measurement sensors for obtaining telemetry data associated with the dedicated channel 108, 208.

Certain embodiments incorporating the dedicated channel 108, 208 for forming a loop-back connection of the out-of-band channel may provide an advantage in that loop-back testing may be conducted without interfering with communication traffic handled by the other channels of the transmission medium, while simultaneously verifying proper operation of the components of the communication network against various failure modes common to multi-channel transmission mediums. For an example in which the transmission medium comprises a DWDM optical fiber transmission medium, because the out-of-band channel uses the same transmission medium as the other communication channels (i.e., in line signaling), loop-back testing of the out-of-band channel may reveal failure modes that also affect the communication channels, such as lossy connectors, improperly installed connectors, misaligned connectors, damage to the fiber optic cable, fiber cable cuts, and the like. Thus, loop-back testing of the out-of-band channel may provide efficient verification of various performance aspects of the transmission medium, while not affecting operation of the communication channels of the communication network.

Figure 4:
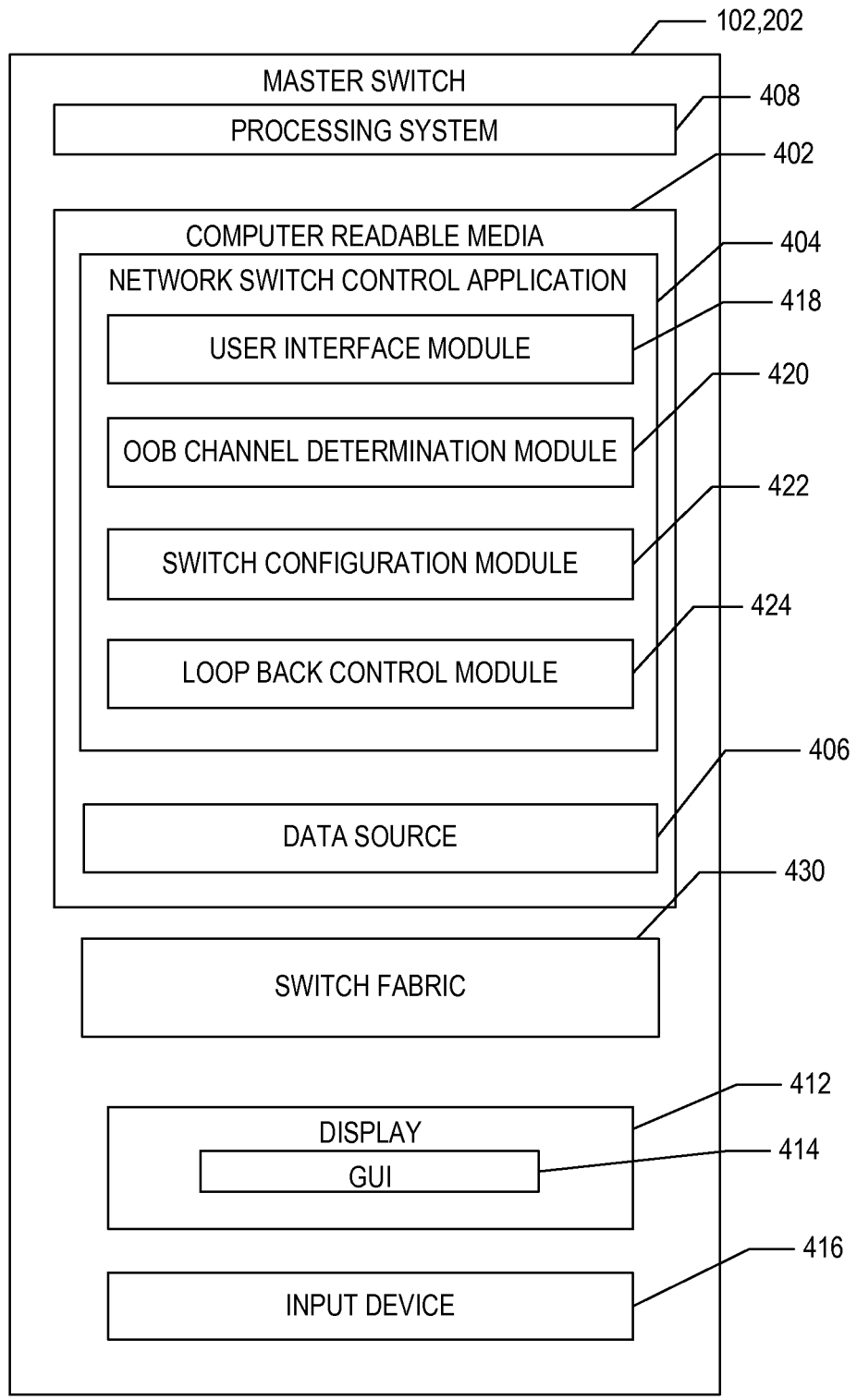
FIG. 4 is a block diagram depicting several details of the master switch of the out-of-band management control system according to the teachings of the present disclosure.

FIG. 4 is a block diagram depicting several details of the master switch 102, 202 of FIGS. 1 and 2. The master switch 102, 202 includes a computer readable media 402 for storage of a network switch control application 404 and a data source 406. The master switch 102, 202 also includes a processing system 408 that includes one or more processors or other processing devices. A processor is hardware. The processing system 408 executes the network switch control application 404 that includes instructions or modules that are executable by the processing system 408 to, among other things, control operation of the communication network.

The computer readable media 402 may include volatile media, nonvolatile media, removable media, non-removable media, and/or another available media that can be accessed by the master switch 102, 202. By way of example and not limitation, computer readable media 402 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Additionally, the computer readable media may embody computer readable instructions, data structures, program modules, or other data and include an information delivery media or system.

The master switch 102, 202 also includes a display 412, such as a computer monitor, for displaying data and/or a graphical user interface (GUI) 414. The master switch 102, 202 also includes an input device 416, such as a keyboard or a pointing device (e.g., a mouse, trackball, pen, or touch screen) to enter data into or interact with the graphical user interface 408. For example, the network switch control application 404 generates the GUI 414 to display adjustable parameters of each local switch 104, 204 in the network, and receives user input from the input device 416 for adjusting these parameters.

A user interface module 418 facilitates the receipt of input data and/or output data from or to a user, respectively. For example, the user interface module 418 may also display one or more selectable fields, editing screens, and the like for receiving the user configuration information from the user. For another example, the user interface module 418 displays information associated with each master node and/or local node in the network along with any configuration information currently assigned to each node. Additionally, the user interface module 418 receives input using the input device 416 for manual adjustment of the configuration of each node and/or for setting up and tearing down loopback connections of one or more nodes.

An out-of-band (OOB) channel determination module 420 determines which channel of the communication medium 106, 206 is to be used for out-of-band control signaling for the network. For example, the OOB channel determination module 420 receives user input from the user interface module 418 for selecting the dedicated channel 108, 208. In another example, the OOB channel determination module 420 automatically selects the OOB channel according to one or more criteria, such as according to its difficulty of access using optical transmit/receive devices, such as those that may be illicitly used by hackers.

A switch configuration module 422 controls operation of the master switch 102, 202 and local switches 104, 204. For example, the master switch 102, 202 and each local switch 104, 204 includes a switch fabric 430 that is used to route traffic among one another. Like the local switches 104, 204, the switch fabric 410 receives configuration information from the network switch control application 404 and modifies its configuration according to the received instructions. In the particular embodiment shown, the switch fabric 430 and the network switch control application 404 are integrated into the master switch 102, 202. In other embodiments, the network switch control application 404 may be implemented on separate computing system from which the switch fabric 430 is implemented such that the switch fabric 430 remotely receives instructions for controlling its operation in a manner similar to how the local switches 104, 204 receives instructions for controlling their operation. While discussed herein as "switches", the term may encompass other network switching devices, such as routers or hubs, depending on the usage of such terms and devices in a network.

According to one embodiment, the switch configuration module 422 provides customized routing plans for customers according to pre-agreed upon performance characteristics associated with these customized routing plans. For example, administrators of the network may have negotiated to provide communication services to a particular customer with a certain guaranteed level of reliability and/or quality of service. Given these constraints, the master switch 102, 202 generates routing information for configuring the switch fabric 430 such that these routes are maintained at the agreed upon reliability and quality of service levels.

Any number and type of parameters may be adjusted by the switch configuration module 422. For example, the switch configuration module 422 may adjust the routing protocol (e.g., STP or RSTP) used by the local switches 104. As another example, the switch configuration module 422 may adjust the network configuration (e.g., ring, string, hybrid, or other configuration) of the switches 104, 204 in the network. As yet another example, if the local switches 104, 204 in the network are configured in a ring configuration, the switch configuration module 422 may adjust whether the switches 104, 204 in the network are to be revertive or not, and is so, adjust a failover time for each local switch 104, 204 that triggers its revertive behavior. As yet another example, the switch configuration module 422 may store a default set of parameters to be downloaded to each local switch 104, 204 upon user request.

A loop-back control module 424 controls the operation of loop-back test devices (e.g., switch fabric 302, optical splitter 304, and/or probe 306, etc.) configured in the communication network. The loop-back control module 424 may control a loop-back test device internally configured in one or more local switches (e.g., FIG. 3A), or a loop-back test device configured externally to either of the local switches (e.g., FIG. 3B). For example, the loop-back control module 424 controls a NID 308 configured at a first position of the network to form a loop-back connection, where the NID 308 measures or otherwise facilitates providing one or more signal characteristics using this loop-back connection. The loop-back control module 424 may then use these measured signal characteristics to determine the overall health of the components of the network, such as, for example, the health of the transmission medium including interconnection systems that couple the transmission medium to the master switch 102, 202 and local switches 104, 204. In some cases, the loop-back control module 424 controls another NID configured at a second position the network to form a second loop-back connection, measure the signal characteristics using this second loop-back connection, and compare the measured signal characteristics with that measured with regard to the first loop-back connection to determine the health of one section of the network relative to another section of the network.

In one embodiment, the network switch control application 404 executes a discovery process to discover local switches 104 and other network nodes in the network, and to receive current configuration settings for each. For example, to handle high levels of traffic volume in one region of the network, a new local switch 104 may be implemented within or close to that region by interconnecting the new local switch 104 to certain other local switches 104 currently implemented in the network. Next, the network switch control application 404 performs one or more routing algorithms to generate routing plans to be used by each local switch 104 and exports this routing plan to the local switches 104. The network switch control application 404 may also generate parameter information for adjusting the parameters of each local switch 104 and export the parameter information to the local switches 104.

It should be appreciated that the modules described herein are provided only as an example of a computing device that may execute the network switch control application 404 according to the teachings of the present invention, and that other computing devices may have the same modules, different modules, additional modules, or fewer modules than those described herein. For example, one or more modules as described in FIG. 4 may be combined into a single module. As another example, certain modules described herein may be encoded and executed on other computing devices, such as one of the local switches 104, 204.

Figure 5:
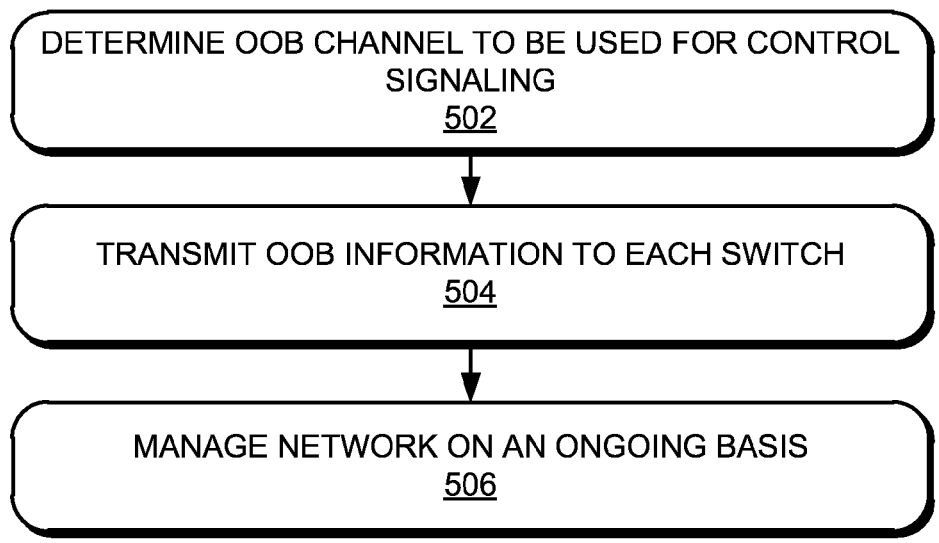
FIG. 5 illustrates an example process that may be performed by the network switch control application according to the teachings of the present disclosure.

FIG. 5 illustrates an example process that may be performed by the network switch control application 404 according to the teachings of the present disclosure. In step 502, the application 404 determines which channel of the communication medium is to be used for out-of-band control signaling for the network. In one embodiment, the application 404 receives user input for manual selection of the dedicated channel 108, 208 from a user. In another embodiment, the application 404 automatically selects the dedicated channel 108, 208 according to one or more criteria. For example, the application 404 may select the dedicated channel 108, 208 according to its difficulty of access using optical transmit/receive devices, such as those that may be illicitly used by hackers. That is, the application 404 may select a particular wavelength of a DWDM communication medium that is not easily circumvented using typically available transmitter/receiver devices for enhanced security. For another example, the application 404 may periodically or aperiodically change the channel that is used for out-of-band signaling for enhanced security. Thereafter, the application 404 transmits the dedicated channel information to each of the local nodes configured in the network in step 504. For example, the application 404 distributes the selected dedicated channel 108, 208 to the local nodes along with a cut over time such that the local nodes may continue receiving control signaling when the master node converts to the newly selected channel.

In step 504, the application 404 manages operation of the network on an ongoing basis. That is, the application 404 administers the operation of the master switch 102 and the local switches 104 to perform various functions, such as route control using the STP, RSTP, and/or SPF protocols, loop-back testing, failover control, and the like. Additionally in one embodiment, the application 404 may also control ancillary equipment at each local switch site. For example, a climate control device, such as an air cooling unit may be in communication with, and provisioned to receive instructions from the application 404 for decreasing an ambient temperature of the environment in which a local switch 104 is located. As another example, a power distribution panel that supplies power to a local switch 104 may be in communication with, and provisioned to receive instructions from the application 404 for switching a source of electrical power that is used to power the local switch 104.

The above described steps may be repeatedly performed by the application 404 for continued administration of the network. Nevertheless, when use of the network or the application 404 is no longer needed or desired, the process ends.

Figure 6:
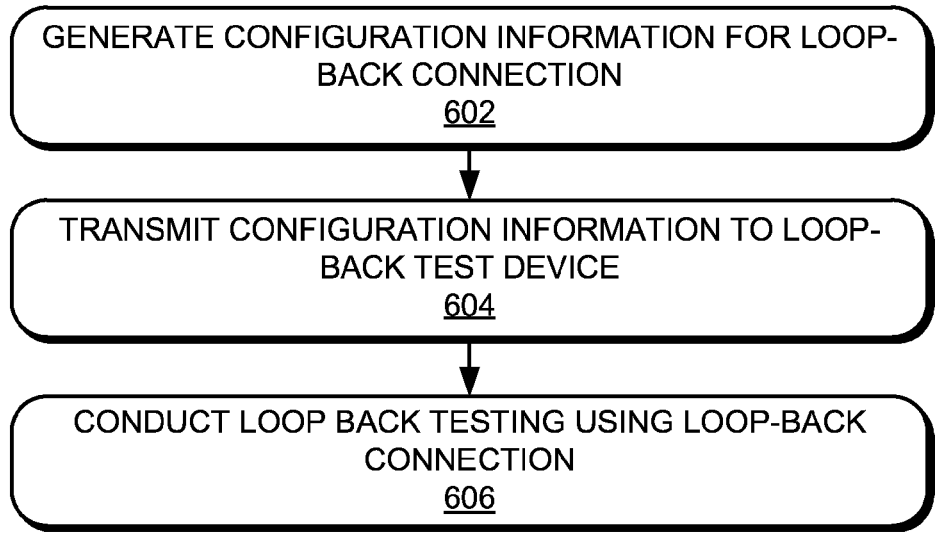
FIG. 6 illustrates another example process that may be performed by the network switch control application to setup and perform a loop-back connection test according to the teachings of the present disclosure.

FIG. 6 illustrates another example process that may be performed by the network switch control application 404 to setup and perform a loop-back connection test according to the teachings of the present disclosure. In step 602, the network switch control application 404 generates configuration information for forming a loop-back connection using a portion of the switch fabric of a switch configured in the network. For example, the input device 416 of the master switch 102, 202 may receive input from a network operator at the master switch 102, 202 to generate the configuration information. The configuration information also includes addressing information to uniquely address the selected local switch 104, 204 for configuring the loop-back connection.

In step 604, the network switch control application 404 transmits the generated configuration information to the selected local switch 104, 204. The configuration information may be transmitted to the local switch in any suitable manner. In one embodiment, the configuration information is transmitted to the selected local switch using the out-of-band channel of the transmission medium 106, 206.

In step 606, the network switch control application 404 conducts loop-back testing of the network using the loop-back connection. For example, the network switch control application 404 measures signal quality received back from the loop-back connection relative to a signal transmitted toward to the loop-back connection. In one embodiment, the network switch control application 404 also receives telemetry information from the NID that has been generated by monitoring circuitry included in the local switch 104, 204. In this manner, the network switch control application 404 may determine signal quality on a path toward the loop-back connection as well as the return path from the loop-back connection.

The process described above may be repeated for other local switches configured in the network to measure signal quality at different locations along the network's path. Nevertheless, when loop-back testing of the communication network is no longer needed or desired, the process ends.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 7:
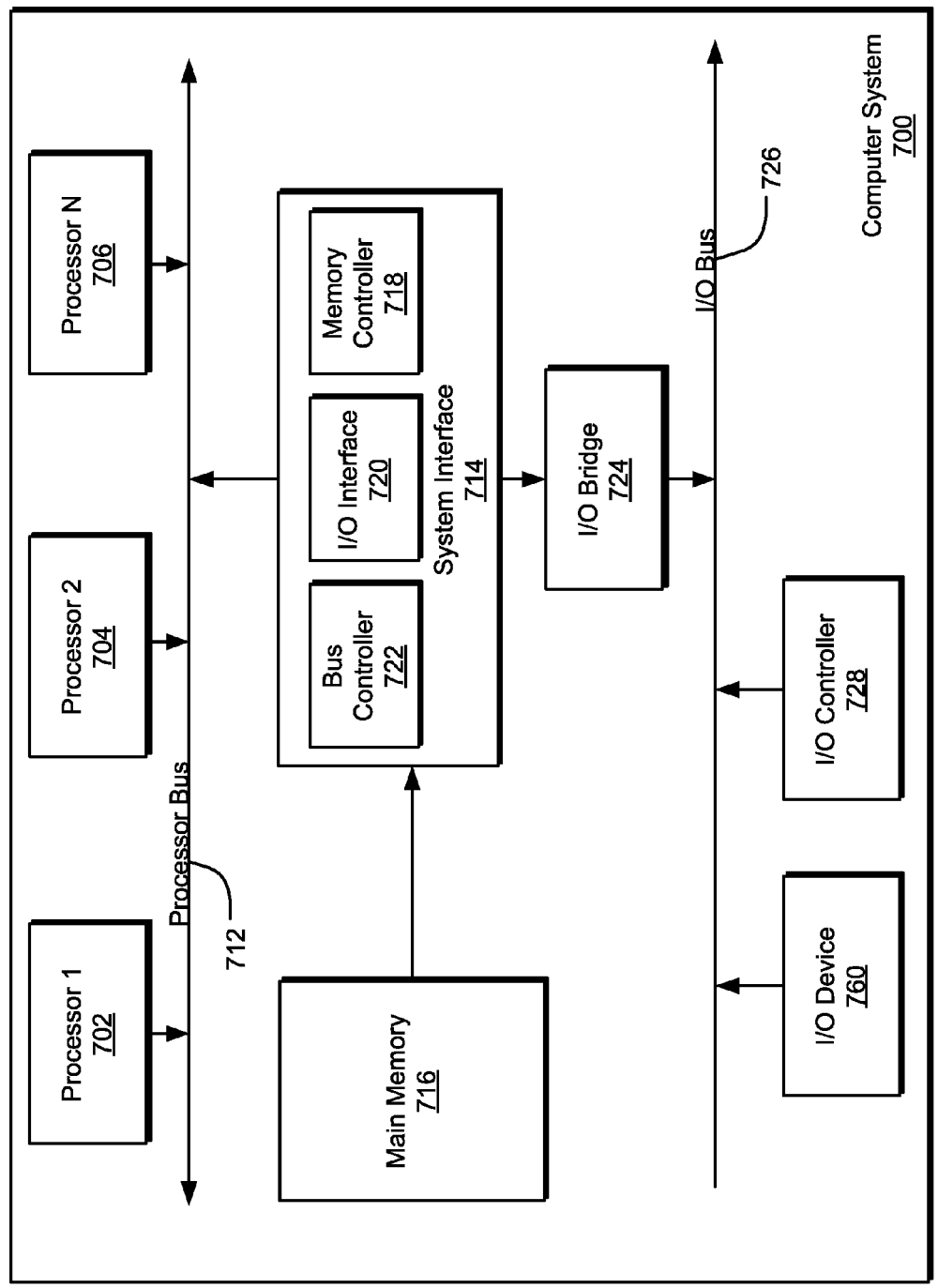
FIG. 7 depicts an example computer system in accordance with embodiments herein.

For example, FIG. 7 is a block diagram illustrating an example of a host or computer system 700 which may be used in implementing the embodiments of the present disclosure. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 713 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device.

Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A communication network comprising:
a plurality of local switches to convey communication traffic between one another using one or more channels of a transmission medium;
a loop-back connection operatively connected to the transmission medium; and
a master switch, operatively connected to the transmission medium and comprising at least one processor and memory, wherein the memory is operatively connected to the at least one processor and stores a controller application that, when executed by the at least one processor, causes the master switch to:
identify an out-of-band channel of the transmission medium that is separate from the channels used to convey the communication traffic;
transmit a test signal towards the loop-back connection over the out-of-band channel;
receive a return signal from the loop-back connection over the out-of-band channel; and
measure the performance of the transmission medium based on the test signal and the return signal.

2. The communication network of claim 1, wherein the loop-back connection is implemented by at least one loop-back test device external to the local network switches.

3. The communication network of claim 1, wherein the loop-back connection is implemented internally by a particular local switch of the plurality of local switches, and wherein the controller application, when executed by the at least one processor, further causes the master switch to:
generate configuration information, the configuration information comprising one or more operating characteristics of the particular local switch and identification of the out-of-band channel; and
transmit the configuration information to the particular switch.

4. The communication network of claim 1, wherein the transmission medium comprises a dense wavelength division multiplexing (DWDM) medium.

5. The communication network of claim 3, wherein the out-of-band channel comprises a wavelength of the DWDM medium that is separate from other wavelengths of the DWDM medium used to convey the communication traffic.

6. The communication network of claim 1, wherein the communication network comprises a packet switched network.

7. The communication network of claim 1, further comprising a loop-back test device, wherein the controller application, when executed by the at least one processor, further causes the master switch to:
select a new out-of-band channel of the transmission medium for loop-back testing, and
transmit identification of the new out-of-band channel to the loop-back test device.

8. The communication network of claim 7, wherein the loop-back test device comprises a particular one of the plurality of local switches.

9. The communication network of claim 7, wherein the loop-back test device comprises an optical splitter configured in line with the transmission medium, wherein channels for the communication traffic are configured in a through connection and the out-of-band channel configured in the loop-back connection.

10. The communication network of claim 1, wherein the local switches are configured in at least one of a ring configuration and a string configuration.

11. A master switch, comprising:
at least one processor;
memory, operatively connected to the at least one processor and storing a controller application that, when executed by the at least one processor, causes the master switch to:
send communication traffic over a transmission medium to a plurality of local switches;
identify an out-of-band channel of the transmission medium that is separate from the channels used to convey the communication traffic;
transmit a test signal towards a loop-back connection over the out-of-band channel;
receive a return signal from the loop-back connection over the out-of-band channel; and
measure the performance of the transmission medium based on the test signal and the return signal.

12. The master switch of claim 11, wherein the controller application, when executed by the at least one processor, further causes the master switch to:
generate configuration information, the configuration information comprising one or more operating characteristics of a particular local switch and identification of the out-of-band channel; and
transmit the configuration information to the particular switch.

13. The master switch of claim 11, wherein the controller application, when executed by the at least one processor, further causes the master switch to:
transmit an identification of the out-of-band channel to a loop-back test device.

14. The master switch of claim 11, wherein the transmission medium comprises a dense wavelength division multiplexing (DWDM) medium.

15. The master switch of claim 14, wherein the out-of-band channel comprises a wavelength of the DWDM medium that is separate from other wavelengths of the DWDM medium used to convey the communication traffic.

16. The master switch of claim 11, wherein the controller application, when executed by the at least one processor, further causes the master switch to perform a discovery process to receive a current configuration for each local switch.

17. The master switch of claim 11, wherein the controller application, when executed by the at least one processor, further causes the master switch to:
select a new out-of-band channel of the transmission medium for loop-back testing, and
transmit identification of the new out-of-band channel to a loop-back test device.

18. A non-transient computer readable storage storing instructions that, when executed by at least one processor, cause the at least one processor to perform a method, the method comprising:
sending communication traffic over a transmission medium to a plurality of local switches;
identifying an out-of-band channel of the transmission medium that is separate from the channels used to convey the communication traffic;
transmitting a test signal towards a loop-back connection over the out-of-band channel;
receiving a return signal from the loop-back connection over the out-of-band channel; and
measuring the performance of the transmission medium based on the test signal and the return signal.

19. The non-transient computer readable storage of claim 18, wherein the method further comprises:
generating configuration information, the configuration information comprising one or more operating characteristics of a particular local switch and identification of the out-of-band channel; and
transmitting the configuration information to the particular switch.

20. The non-transient computer readable storage of claim 18, wherein the method further comprises:
transmitting an identification of the out-of-band channel to a loop-back test device.

* * * * *